(12) United States Patent
Lin

(10) Patent No.: US 11,847,473 B1
(45) Date of Patent: Dec. 19, 2023

(54) ADAPTIVE GRAPHICAL USER INTERFACES FOR SYNTHESIZED TIME-WINDOWED MACHINE LEARNING MODELS

(71) Applicant: Evernorth Strategic Development, Inc., St. Louis, MO (US)

(72) Inventor: Yu Shen Lin, Fairfax Station, VA (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 0 days.

(21) Appl. No.: 17/859,243

(22) Filed: Jul. 7, 2022

(51) Int. Cl.
   G06F 9/451 (2018.01)
   G06N 20/20 (2019.01)
   G06F 18/2431 (2023.01)

(52) U.S. Cl.
   CPC .......... *G06F 9/451* (2018.02); *G06F 18/2431* (2023.01); *G06N 20/20* (2019.01)

(58) Field of Classification Search
   CPC ...... G06F 9/451; G06F 18/2431; G06N 20/20
   See application file for complete search history.

(56) References Cited

U.S. PATENT DOCUMENTS

| | | | |
|---|---|---|---|
| 10,453,456 B2 | 10/2019 | Nicholls | |
| 10,545,518 B2 | 1/2020 | Shetty | |
| 10,706,109 B2 | 7/2020 | Ansari | |
| 10,991,265 B2 | 4/2021 | Jadhav | |
| 11,610,679 B1* | 3/2023 | Zhan | G16H 15/00 |
| 2005/0261918 A1 | 11/2005 | Carr | |
| 2014/0336788 A1 | 11/2014 | Paunonen | |
| 2015/0242930 A1 | 8/2015 | Greystoke | |
| 2017/0091883 A1 | 3/2017 | Greystoke | |
| 2017/0123440 A1 | 5/2017 | Mangsuli | |
| 2017/0270416 A1 | 9/2017 | Sri | |
| 2021/0005321 A1* | 1/2021 | Hwang | G16H 10/60 |

OTHER PUBLICATIONS

Bailey, Clifford J. "Under-treatment of type 2 diabetes: Causes and outcomes of clinical inertia." International Journal of Clinical Practice 70.12 (2016): 988-995.

Breiman, Leo. "Random forests." Machine learning 45 (2001): 5-32.

(Continued)

*Primary Examiner* — Tadesse Hailu
*Assistant Examiner* — Darrin Hope
(74) *Attorney, Agent, or Firm* — Miller Johnson

(57) ABSTRACT

A computerized method of transforming an interactive graphical user interface according to machine learning includes generating a selectable user interface element corresponding to a persona. In response to a user selecting the user interface element, data structures related to the persona are extracted from a first data store. The data structures are transformed into a set of input variables at a data processing module and loaded at a model execution module. The model execution module generates a first output variable based on the set of input variables. An analysis module generates a second output variable based on the first input variable. The graphical user interface displays a first message, a second message, or a third message in response to conditions being met for the second output variable.

20 Claims, 10 Drawing Sheets

(56) References Cited

OTHER PUBLICATIONS

Buja, et al. Health and health service usage outcomes of case management for patients with long-term conditions: a review of reviews. Prim Health Care Res Dev. Aug. 3, 2020;21:e26. doi: 10.1017/S1463423620000080. PMID: 32744213; PMCID: PMC7443792.

Cichosz, Toward Big Data Analytics: Review of Predictive Models in Management of Diabetes and Its Complications. J Diabetes Sci Technol. Oct. 14, 2015;10(1):27-34. doi: 10.1177/1932296815611680. PMID: 26468133; PMCID: PMC4738225.

Freisling, Heinz, et al. "Lifestyle factors and risk of multimorbidity of cancer and cardiometabolic diseases: a multinational cohort study." BMC medicine 18 (2020): 1-11.

Friedman, Jerome H. "Greedy function approximation: a gradient boosting machine." Annals of statistics (2001): 1189-1232.

Gamache et al. Public and Population Health Informatics: The Bridging of Big Data to Benefit Communities. Yearb Med Inform. Aug. 2018;27(1):199-206. doi: 10.1055/s-0038-1667081. Epub Aug. 29, 2018. PMID: 30157524; PMCID: PMC6115205.

Goldstein et al, Moving beyond regression techniques in cardiovascular risk prediction: applying machine learning to address analytic challenges. Eur Heart J. Jun. 14, 2017;38(23):1805-1814. doi: 10.1093/eurheartj/ehw302. PMID: 27436868; PMCID: PMC5837244.

Li, Yan, et al. "Unhealthy behaviors, prevention measures, and neighborhood cardiovascular health: a machine learning approach." Journal of Public Health Management and Practice 25.1 (2019): E25-E28.

Lu et al. Interactive Mobile Health Intervention and Blood Pressure Management in Adults. Hypertension. Sep. 2019;74(3):697-704. doi: 10.1161/HYPERTENSIONAHA.119.13273. Epub Jul. 22, 2019. PMID: 31327259.

Mathur, et al Artificial Intelligence, Machine Learning, and Cardiovascular Disease. Clin Med Insights Cardiol. Sep. 9, 2020;14:1179546820927404. doi: 10.1177/1179546820927404. PMID: 32952403; PMCID: PMC7485162.

Merlo, Juan, et al. "The tyranny of the averages and the indiscriminate use of risk factors in public health: the case of coronary heart disease." SSM-population health 3 (2017): 684-698.

Morgenstern, Jason Denzil, et al. "Predicting population health with machine learning: a scoping review." BMJ open 10.10 (2020): e037860.

Petrovic, et al. The contribution of health behaviors to socioeconomic inequalities in health: A systematic review. Prev Med. Aug. 2018;113:15-31. doi: 10.1016/j.ypmed.2018.05.003. Epub May 9, 2018. PMID: 29752959.

Philipp, et al. "Practice of reporting social characteristics when describing representativeness of epidemiological cohort studies—A rationale for an intersectional perspective." SSM—Population Health 11 (2020): 100617.

Rowley et al, Diabetes 2030: Insights from Yesterday, Today, and Future Trends. Popul Health Manag. Feb. 2017;20(1):6-12. doi: 10.1089/pop.2015.0181. Epub Apr. 28, 2016. PMID: 27124621; PMCID: PMC5278808.

Shah, Using Machine Learning to Peek Inside the Minds of NFL Coaches, https://www.datarobot.com/blog/using-machine-learning-to-peek-inside-the-minds-of-nfl-coaches/, Jan. 30, 2019.

Shameer, Khader, et al. "Machine learning in cardiovascular medicine: are we there yet ?." Heart 104.14 (2018): 1156-1164.

Soril et al, Reducing frequent visits to the emergency department: a systematic review of interventions. PLOS One. Apr. 13, 2015;10(4):e0123660. doi: 10.1371/journal.pone.0123660. PMID: 25874866; PMCID: PMC4395429.

Stokes et al, Effectiveness of Case Management for 'At Risk' Patients in Primary Care: A Systematic Review and Meta-Analysis. PLoS One. Jul. 17, 2015;10(7):e0132340. doi: 10.1371/journal.pone.0132340. PMID: 26186598; PMCID: PMC4505905.

Triantafyllidis et al, Applications of Machine Learning in Real-Life Digital Health Interventions: Review of the Literature. J Med Internet Res. Apr. 5, 2019;21(4):e12286. doi: 10.2196/12286. PMID: 30950797; PMCID: PMC6473205.

Tsuzuki, S., Fujitsuka, N., Horiuchi, K. et al. Factors associated with sufficient knowledge of antibiotics and antimicrobial resistance in the Japanese general population. Sci Rep 10, 3502 (2020). https://doi.org/10.1038/s41598-020-60444-1.

Van Loenen et al Organizational aspects of primary care related to avoidable hospitalization: a systematic review. Fam Pract. Oct. 2014;31(5):502-16. doi: 10.1093/fampra/cmu053. Epub Sep. 12, 2014. PMID: 25216664.

Verhestraeten, Clinical inertia in the treatment of heart failure: a major issue to tackle. Heart Fail Rev 26, 1359-1370 (2021). https://doi.org/10.1007/s10741-020-09979-z.

\* cited by examiner

ADAPTIVE GRAPHICAL USER INTERFACES FOR SYNTHESIZED TIME-WINDOWED MACHINE LEARNING MODELS

FIELD

The present disclosure relates to multi-model machine learning and, more particularly, to multi-layered machine learning architectures and user interfaces to synthesize machine-learning-generated predictions.

BACKGROUND

Conventional user interfaces for machine learning models used in healthcare applications typically call on machine learning models to predict likely outcomes for a single problem occurring during a single time window. For example, a conventional machine learning model may—given the requisite set of input variables—predict a likelihood of a patient being admitted to a healthcare facility within the single time window for the single problem (e.g., the likelihood of the patient being admitted to a hospital within the next sixth months as a result of diabetes). However, as described, conventional machine learning models and user interfaces for machine learning models do not account for the complex interactions occurring between multiple problems across multiple time windows.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computerized method for transforming an interactive graphical user interface according to machine learning is presented. The method includes generating a selectable user interface element at the graphical user interface. The selectable user interface element corresponds to a persona. the method includes extracting data structures related to the persona from a first data store in response to a user selecting the selectable user interface element, transforming the data structures into a set of input variables at a data processing module, loading the set of input variables at a model execution module, generating a first output variable based on the set of input variables at the model execution module, and generating a second output variable based on the first output variable at an analysis module.

The method includes transforming the graphical user interface to display a first message in response to the second output variable exceeding (that is, being greater than) a first threshold, transforming the graphical user interface to display a second message in response to the second output variable not exceeding the first threshold and a marker being present in the data structures, transforming the graphical user to display the second message in response to the second output variable exceeding a second threshold, and transforming the graphical user interface to display a third message in response to the second output variable exceeding a third threshold.

Generating the first output variable based on the set of input variables includes loading the set of input variables at each machine learning model of a first set of machine learning models, generating a first set of first intermediate output variables based on the set of input variables at the first set of machine learning models, determining a largest first intermediate output variable of the first set of first intermediate output variables, and determining a second intermediate output variable for the first set of machine learning models based on the machine learning model corresponding to the largest first intermediate output variable of the first set of first intermediate output variables.

In other features, generating the first output variable based on the set of input variables includes loading the set of input variables at each machine learning model of a second set of machine learning models, generating a second set of first intermediate output variables based on the set of input variables at the second set of machine learning models, determining a largest first intermediate variable of the second set of first intermediate output variables, and determining a second intermediate output variable for the second set of machine learning models based on the machine learning model corresponding to the largest first intermediate output variable of the second set of first intermediate output variables. In other features, generating the first output variable based on the set of input variables includes summing the second intermediate output variable for the first set of first intermediate output variables and the second intermediate output variable for the second set of first intermediate output variables to generate the first output variable.

In other features, the first set of machine learning models includes a first trained machine learning model configured to predict a likelihood of a first condition occurring within a first time window, a second trained machine learning model configured to predict a likelihood of the first condition occurring within a second time window, and a third trained machine learning model configured to predict a likelihood of the first condition occurring within the third time window. In other features, the first trained machine learning model is an elastic-net classifier, the second trained machine learning model is a generalized additive model, and the third trained machine learning model is a gradient boosted trees classifier model. In other features, the first time window is between 1 and 90 days, the second time window is between 91 and 270 days, and the third time window is between 271 and 365 days.

In other features, generating the second output variable based on the first output variable includes determining a percentile score of the first output variable for the persona by comparing the first output variable against a set of historical first output variables generated for a population. In other features, the first threshold is about a 70th percentile score, the second threshold is about a 56th percentile score, and the third threshold is about an 11th percentile score.

In other features, an action set sequencing module is configured to execute a first action execution module in response to the graphical user interface being transformed to display the first message, the action set sequencing module is configured to execute a second action execution module in response to the graphical user interface being transformed to display the second message, and the action set sequencing module is configured to execute a third action execution module in response to the graphical user interface being transformed to display the third message.

In other features, the method includes transforming the data structures into the set of input variables includes loading a first data structure corresponding to the persona and determining whether the first data structure is a claim related to a service. In response to determining the first data structure is related to a service, the method includes calculating a time difference between a time the service was performed and a time the selectable user interface element was generated. The method includes transforming the time difference into a dynamic input variable and adding the dynamic input variables to the set of input variables.

A computerized method of transforming an interactive graphical user interface according to machine learning is also presented. The method includes generating a first selectable user interface element at a graphical user interface. The first selectable user interface element corresponds to a persona. The method includes extracting data structures related to the persona from a first data store in response to a user selecting the selectable user interface element, transforming the data structures into a set of input variables at a data processing module, loading the set of input variables at a model executing module, generating a first output variable based on the set of input variables at the model execution module, generating a second output variable based on the first output variable at an analysis module, transforming the graphical user interface to display the second output variable, and generating a second selectable user interface element.

The method includes modifying the set of input variables in response to the user selecting the second selectable user interface element, generating a modified first output variable based on the modified set of input variables at the model execution module, generating a modified second output variable based on the modified first input variable at the analysis module, and transforming the graphical user interface according to the modified second output variable.

In other features, generating the first output variable based on the set of input variables includes loading the set of input variables at each machine learning model of a first set of machine learning models, generating a first set of first intermediate output variables based on the set of input variables at the first set of machine learning models, determining a largest first intermediate output variable of the first set of first intermediate output variables, and determining a second intermediate output variable for the first set of machine learning models based on the machine learning model corresponding to the largest first intermediate output variable of the first set of first intermediate output variables.

In other features, generating the first output variable based on the set of input variables includes loading the set of input variables at each machine learning model of a second set of machine learning models, generating a second set of first intermediate output variables based on the set of input variables at the second set of machine learning models, determining a largest first intermediate variable of the second set of first intermediate output variables, and determining a second intermediate output variable for the second set of machine learning models based on the machine learning model corresponding to the largest first intermediate output variable of the second set of first intermediate output variables. In other features, generating the first output variable based on the set of input variables includes summing the second intermediate output variable for the first set of first intermediate output variables and the second intermediate output variable for the second set of first intermediate output variables to generate the first output variable.

In other features, the first set of machine learning models includes a first trained machine learning model configured to predict a likelihood of a first condition occurring within a first time window, a second trained machine learning model configured to predict a likelihood of the first condition occurring within a second time window, and a third trained machine learning model configured to predict a likelihood of the first condition occurring within a third time window. In other features, the first trained machine learning model is an elastic-net classifier, the second trained machine learning model is a generalized additive model, and the third trained machine learning model is a gradient boosted trees classifier model. In other features, the first time window is between 1 and 90 days, the second time window is between 91 and 270 days, and the third time window is between 271 and 365 days.

In other features, the method includes transforming the data structures into the set of input variables includes loading a first data structure corresponding to the persona and determining whether the first data structure is a claim related to a service. In response to determining the first data structure is related to a service, the method includes calculating a time difference between a time the service was performed and a time the selectable user interface element was generated. The method includes transforming the time difference into a dynamic input variable and adding the dynamic input variables to the set of input variables.

A non-transitory computer-readable medium including executable instructions for transforming a graphical user interface according to machine learning is presented. The executable instructions include generating a selectable user interface element at the graphical user interface. The selectable user interface element corresponds to a persona. The executable instructions include extracting data structures related to the persona from a first data store in response to a user selecting the selectable user interface element, transforming the data structures into a set of input variables at a data processing module, loading the set of input variables at a model execution module, generating a first output variable based on the set of input variables at the model execution module, generating a second output variable based on the first output variable at an analysis module, transforming the graphical user interface to display a first message in response to the second output variable exceeding a first threshold, transforming the user interface to display a second message in response to the second output variable not exceeding the first threshold and a marker being present in the data structures, transforming the graphical user interface to display the second message in response to the second output variable exceeding a second threshold, and transforming the graphical user interface to display a third message in response to the second output variable exceeding a third threshold.

Generating the first output variable based on the set of input variables includes loading the set of input variables at each machine learning model of a first set of machine learning models, generating a first set of first intermediate output variables based on the set of input variables at the first set of machine learning models, determining a largest first intermediate output variable of the first set of first intermediate output variables, determining a second intermediate output variable for the first set of machine learning models based on the machine learning model corresponding to the largest first intermediate output variable of the first set of first intermediate output variables, loading the set of input variables at each machine learning model of a second set of machine learning models, generating a second set of first intermediate output variables based on the set of input variables at the second set of machine learning models, determining a largest first intermediate variable of the second set of first intermediate output variables, and determining a second intermediate output variable for the second set of machine learning models based on the machine learning model corresponding to the largest first intermediate output variable of the second set of first intermediate output variables.

In other features, the first set of machine learning models includes a first trained machine learning model configured to predict a likelihood of a first condition occurring within a first time window, a second trained machine learning model configured to predict a likelihood of the first condition occurring within a second time window, and a third trained machine learning model configured to predict a likelihood of the first condition occurring within a third time window. The first trained machine learning model is an elastic-net classifier, the second trained machine learning model is a generalized additive model, and the third trained machine learning model is a gradient boosted trees classifier model.

In other features, executable instructions include transforming the data structures into the set of input variables includes loading a first data structure corresponding to the persona and determining whether the first data structure is a claim related to a service. The executable instructions include calculating a time difference between a time the service was performed and a time the selectable user interface element was generated in response to determining the first data structure is related to a service. The executable instructions include transforming the time difference into a dynamic input variable and adding the dynamic input variables to the set of input variables.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
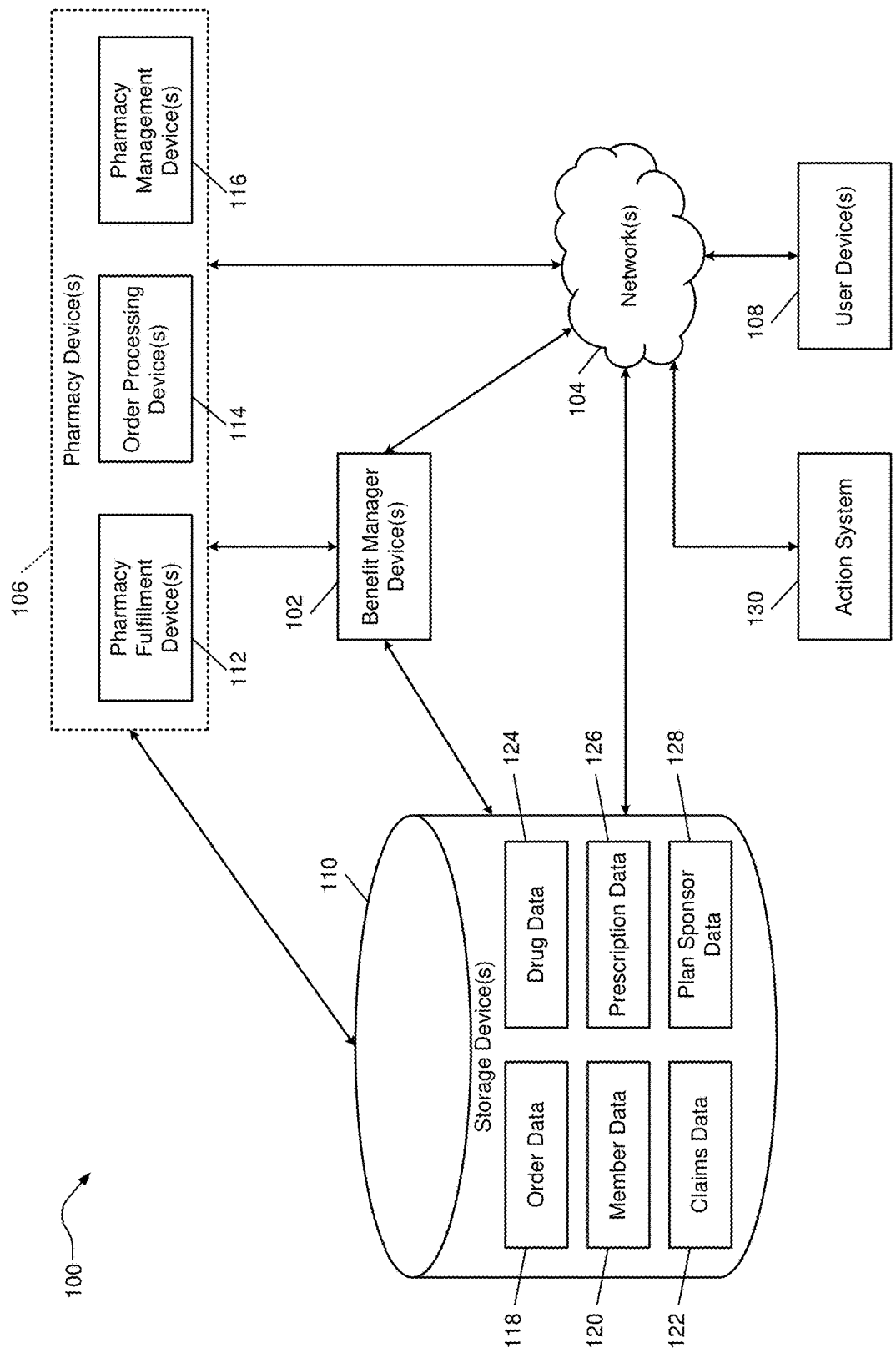
FIG. 1 is a functional block diagram of an example system including a high-volume pharmacy.

A novel machine learning-based action system improves upon conventional machine learning technologies by automatically predicting outcomes for multiple conditions across multiple time windows using a unified set of input variables. The action system can automatically evaluate and synthesize the response variables output by multiple trained machine learning models and generate a single integrated response variable. The single integrated response variable may account for the likelihood of each of the multiple conditions occurring across each of the multiple time windows. The action system may automatically evaluate and generate recommendations based on the single integrated response variable.

The action system may be integrated with and/or access healthcare databases. For example, the action system can automatically parse the databases for relevant data related to a user, extract the relevant data, and transform the data into the unified set of input variables. The action system may provide the unified set of input variables to a set of trained machine learning models. The set of trained machine learning models may be divided into multiple subsets of trained machine learning models. Each subset of trained machine learning models may be configured to predict outcomes for a single condition. Within each subset, each trained machine learning model may predict an outcome for the single condition within a specific time window. The action system may automatically analyze the response variables for each of the trained machine learning models within each subset and return a single intermediate output variable for each subset. The action system may automatically analyze the returned intermediate output variables for all of the subsets and synthesize all of the intermediate output variables into a single final output variable.

The action system may also automatically determine a course of action for the user based on the single final output variable. In various implementations, the action system may automatically execute the course of action.

The action system may automatically generate a user interface. The user interface may allow one or more users to interact with the action system. In various implementations, the action system may generate selectable user interface elements. In response to a user selecting one or more user interface elements, the action system may automatically generate the single final output variable. In various implementations, the action system may automatically transform the user interface to output the modified single final output variable. In various implementations, the action system may automatically transform the user interface to output the course of action.

The action system provides a variety of improvements over existing machine learning applications. Generally, conventional machine learning models predict outcomes for single conditions within single time windows. The action system described in this specification addresses these shortcomings by automatically accounting for the complex interactions between different conditions occurring within multiple time windows, generating the single output variable, and automatically determining an optimal course of action based on the single output variable. Furthermore, by automatically accounting for the complex interactions between multiple conditions occurring in multiple time windows, the action system shows great improvements in accuracy over conventional machine learning models. Additionally, by utilizing a single unified set of input variables, the action system reduces the number of computational resources required (e.g., by reducing duplicative processing).

High-Volume Pharmacy

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
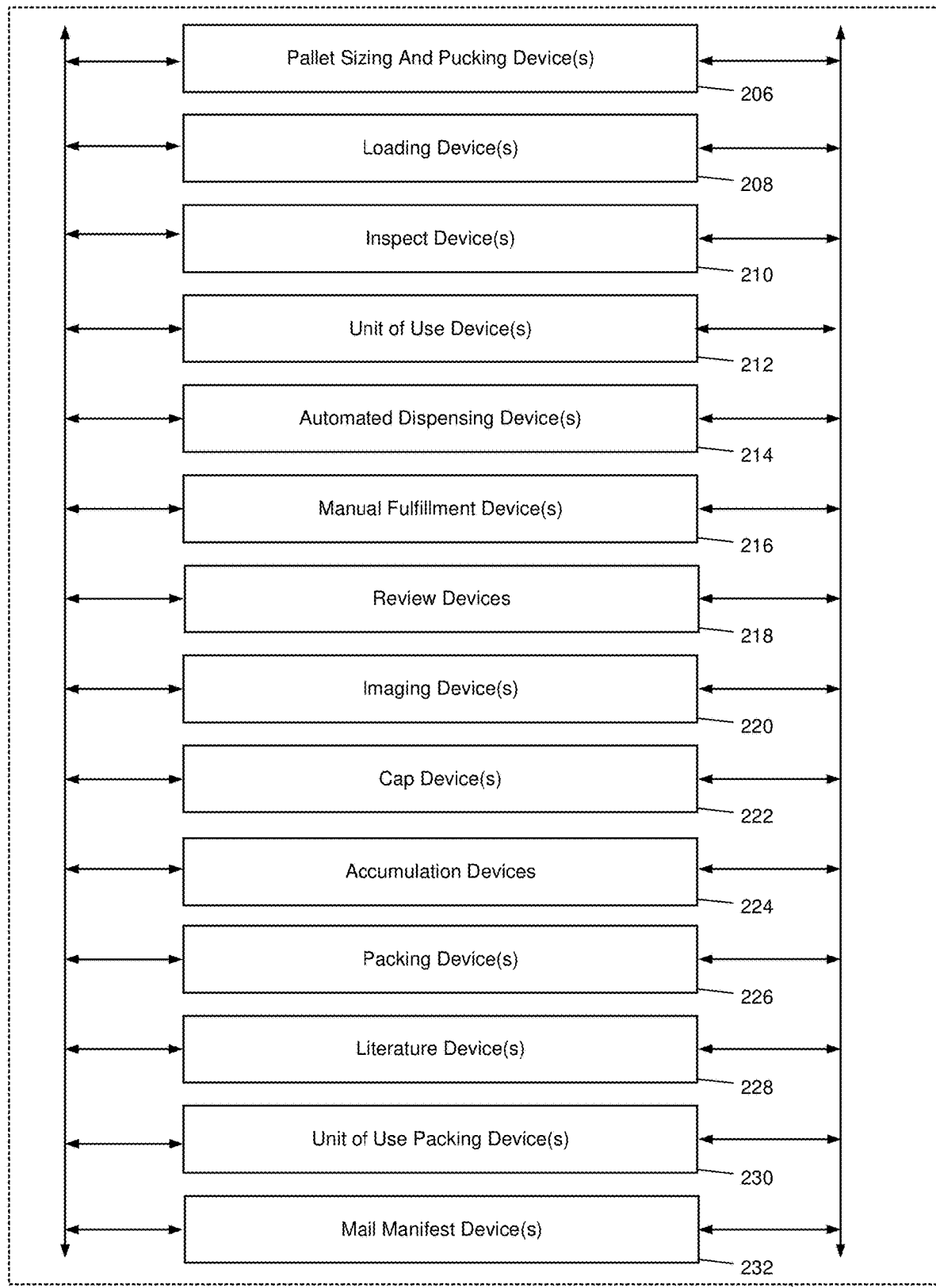
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
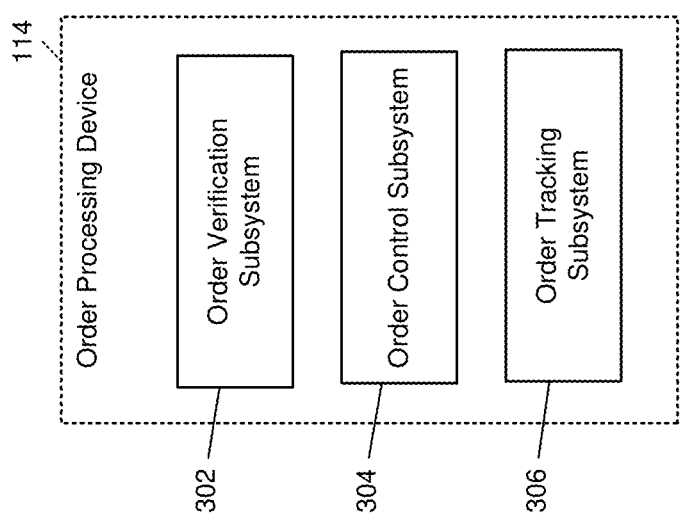
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Action System

Returning to FIG. 1, the system 100 may include a machine learning system—such as an action system 130—capable of automatically predicting multiple outcomes for multiple conditions across multiple time windows with a single unified set of input variables, and generating a single output variable based on an automatic synthesis of the multiple outcomes. In various implementations, the action system 130 may be capable of automatically predicting a likelihood of a patient being admitted to a healthcare facility. The action system 130 may automatically account for the complex interactions between multiple health-related conditions, including likely time windows each health-related condition may be likely to occur. The action system 130 may automatically synthesize each of these variables and generate a single output variable. The single output variable may represent an overall risk assessment of the patient. In various implementations, the action system 130 may output the single output variable via a user interface. In various implementations, the action system 130 may automatically parse the single output variable and perform one or more automated actions based on the analysis of the single output variable. In various implementations, the action system 130 may allow the user to automatically perform sensitivity analysis by selectively modifying the input variables.

In various implementations, the action system 130 may communicate with other components of the system 100 directly, or through a network such as network 104. For example, the action system 130 may be in communication with the user devices 108 and/or the storage devices 110 through the network 104. The storage devices 110 may contain data that the action system 130 may use (directly or after further processing) as input variables for the various machine learning models of the action system 130. For example, the storage devices 110 may contain any combination of the data structures (which may be used as input variables by the action system 130) described below in Table 1:

TABLE 1

| Data structures (potential input variables) |
|---|
| Age |
| Gender |
| Race |
| Social determinants of health (SDI) |
| Job type |
| Education |
| Income |
| Body mass index (BMI) |
| Smoker or non-smoker |
| Exercise level |
| Alcohol usage data |
| Diet data |
| Fat content in diet |
| High-fiber food content in diet |
| Sleep data |
| Behavioral data |
| Hemoglobin A1c test data |
| Low-density lipoprotein (LDL) levels |
| Health assessment data |
| Ethyl glucuronide levels |
| Major disease diagnosis |
| Depression diagnosis |
| Diabetes diagnosis |
| Acute myocardial infarction (AMI) diagnosis |
| Cardiovascular disease diagnosis |

TABLE 1-continued

| Data structures (potential input variables) |
|---|
| Congestive heart failure diagnosis |
| Hypertension diagnosis |
| Hypotension diagnosis |
| Lower back pain diagnosis |
| Gastroparesis diagnosis |
| Acute pulmonary edema diagnosis |
| Acute renal failure diagnosis |
| Ketoacidosis diagnosis |
| Cellulitis diagnosis |
| Coronary artery disease diagnosis |
| Congestive heart failure diagnosis |
| Ischemic heart disease diagnosis |
| Left ventricular hypertrophy diagnosis |
| Dyslipidemia diagnosis |
| Nutritional disorder diagnosis |
| Metabolic disorder diagnosis |
| Joint disorder diagnosis |
| Osteoarthritis diagnosis |
| Claims data |
| Total claim costs organized by International Classification of Disease (ICD) group code |
| Total cost of claims |
| Service type associated with claims (e.g., office visits, lab work, radiology labs, advanced imaging labs, rehabilitation visits, inpatient visits, emergency room visits, etc.) |
| Provider specialties associated with claims |
| Primary care physician (PCP) claims |
| Cardiologist claims |
| X-ray claims |
| Magnetic resonance imaging (MRI) scan claims |
| Computed tomography (CT) scan claims |
| Prescription medication claims |
| Prior authorization claims |
| Coronary artery bypass graft surgery (CABG) claims |
| Diabetes claims |
| Cardiovascular disease claims |
| Congestive heart failure claims |
| Cardiologist visit claims |
| Hypertension claims |
| Orthopedic surgeon visit claims |
| Neurosurgeon visit claims |
| Physical therapy visit claims |
| Pain-related medical visits claims |
| Spinal injection claims |
| Prescription aspirin claims |
| Statins claims |
| Angiotensin-converting enzyme inhibitors (ACE-I) claims |
| Beta-adrenergic blocking agent ("beta blockers") claims |
| Non-steroidal anti-inflammatory drugs (NSAID) claims |
| Anti-depression medication claims |
| Angiotensin receptor blocker (ARB) dosage |
| Calcium channel blocking agent claims |
| Opioid claims |
| Prescription aspirin prescribed dosage |
| Statins prescribed dosage |
| ACE-I prescribed dosage |
| Beta blockers prescribed dosage |
| NSAID prescribed dosage |
| Anti-depression medication prescribed dosage |
| ARB prescribed dosage |
| Calcium channel blocking agent prescribed dosage |
| Opioid prescribed dosage |
| Prescription aspirin compliance data |
| Statins compliance data |
| ACE-I compliance data |
| Beta blockers compliance data |
| NSAID compliance data |
| Anti-depression medication compliance data |
| ARB compliance data |
| Calcium channel blocking agent compliance data |
| Opioid compliance data |

In various implementations, one or more of the data structures of Table 1 may be associated with one or more members. In various implementations, one or more of the data structure of Table 1 may be associated with each member.

Figure 4:
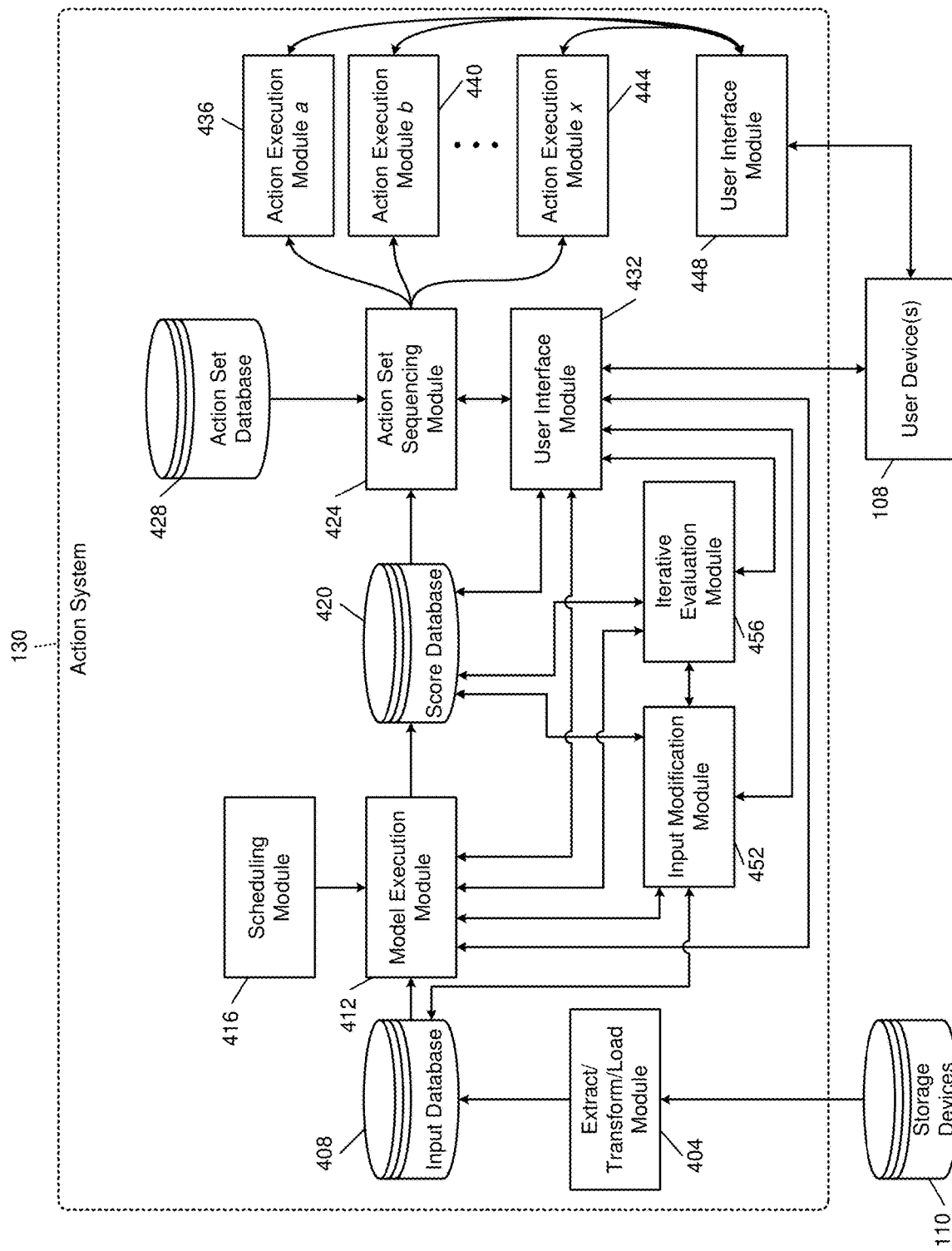
FIG. 4 is a block diagram of an example implementation of an action system, which may be deployed within the system of FIG. 1.

FIG. 4 is a block diagram of an example implementation of the action system 130. In various implementations, the action system 130 includes a data processing module such as an extract/transform/load module 404, an input database 408, a model execution module 412, and/or a score database 420. The extract/transform/load module 404 parses data structures (such as those described above in Table 1) present in the storage devices 110, extracts the data structures, transforms them into the unified set of input variables, and saves the input variables to the input database 408. The model execution module 412 retrieves the unified set of input variables from the input database 408, automatically generates the single output variable, and saves the single output variable to the score database 420. In various implementations, the scheduling module 416 automatically schedules execution of the model execution module 412. For example, the scheduling module 416 may schedule the model execution module 412 to automatically run on a scheduled basis.

In various implementations, the action system 130 also includes an action set sequencing module 424, an action set database 428, and/or a user interface module 432. The action set sequencing module 424 may retrieve the single output variable from the score database 420, automatically parse the single output variable, and automatically select one or more action sets from the action set database 428 based on its analysis of the single output variable. The action set database 428 may automatically execute the selected action sets as action execution modules. For example, if the action set sequencing module 424 selects action sets a, b, and x from the action set database 428, the action set sequencing module 424 may execute action execution module a 436 (corresponding to action set a), action execution module b 440 (corresponding to action set b), and action execution module x 444 (corresponding to action set x).

In various implementations, the action system 130 may also include a second user interface module 448. The user device 108 may access the model execution module 412, the score database 420, and/or the action set sequencing module 424 via the user interface module 432. In various implementations, the user device 108 may access the action execution modules—such as the action execution module a 436, action execution module b 440, and/or action execution module x 444—via the user interface module 448. In various implementations, the user device 108 may access the model execution module 412, the score database 420, and/or the action set sequencing module 424 via the user interface module 432.

In various implementations, the action system 130 may include an input modification module 452 and/or an iterative evaluation module 456. The user device 108 may access the input modification module 452 and/or the iterative evaluation module 456 via the user interface module 432. The input modification module 452 may selectively modify input variables loaded from the input database 408, and the iterative evaluation module 456 may control the input modification module 452 in order to automatically schedule and control modification of the input variables.

Figure 5:
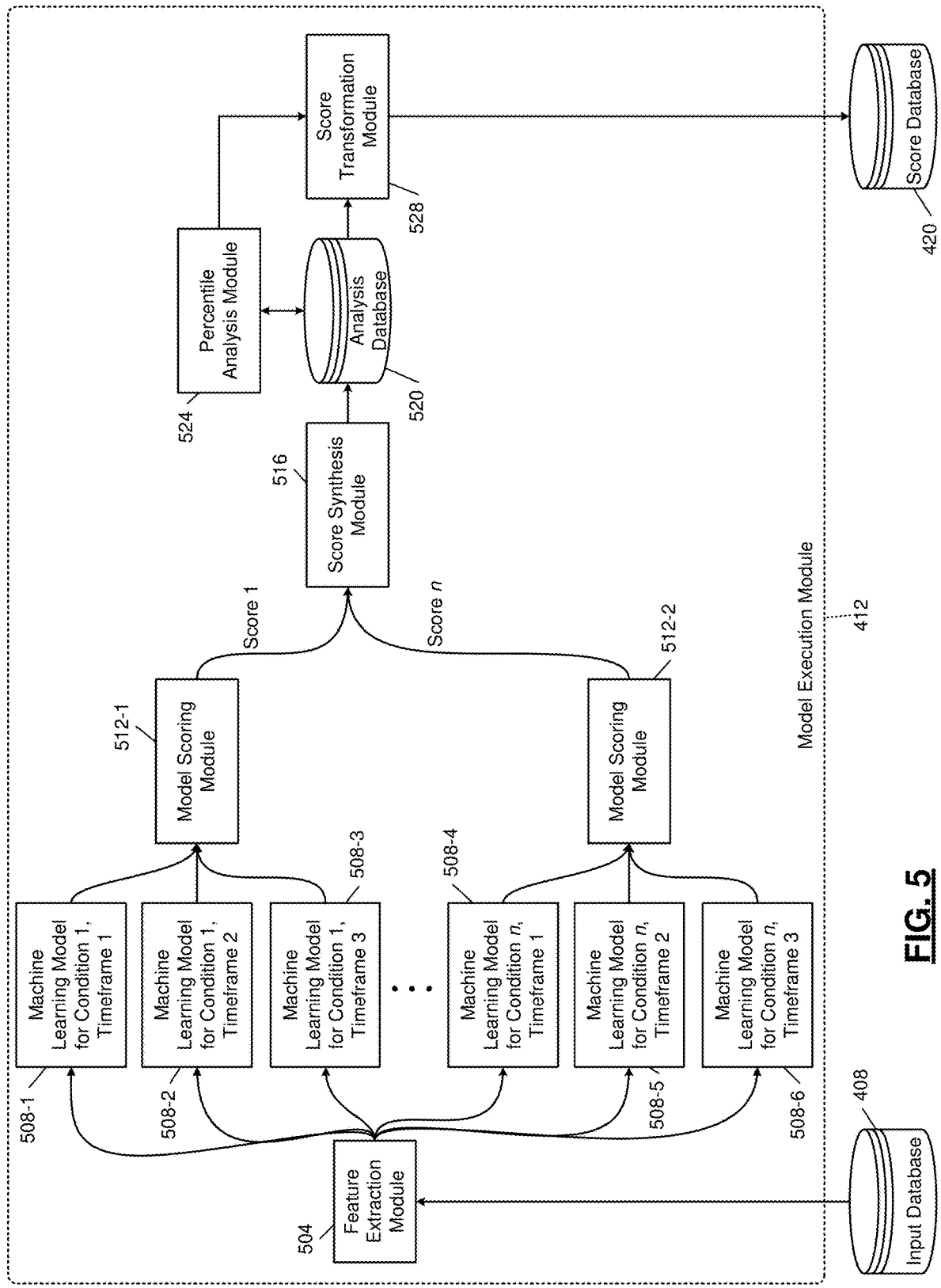
FIG. 5 is a block diagram of an example implementation of the model execution module, which may be deployed within the action system of FIG. 4.

FIG. 5 is a block diagram of an example implementation of the model execution module 412. As previously described, the model execution module 412 may retrieve the unified set of input variables from the input database 408, automatically generate the single output variable based on the unified set of input variables, and save the single output variable to the score database 420. In various implementations, the model execution module 412 includes a feature extraction module 504, machine learning models 508-1, 508-2, 508-3, 508-4, 508-5, and 508-6 (collectively, machine learning models 508), model scoring modules 512-1 and 512-2 (collectively, model scoring modules 512), a score synthesis module 516, an analysis database 520, a percentile analysis module 524, and a score transformation module 528.

In various implementations, the feature extraction module 504 may communicate with the input database 408 and load input variables, such as the unified set of input variables, from the input database 408. The feature extraction module 504 may then provide the loaded input variables to each of the trained machine learning models 508. In various implementations, the model execution module 412 may include a set of trained machine learning models 508 further divided into one or more subsets of trained machine learning models 508. Each subset of trained machine learning models 508 may include machine learning models 508 trained to predict outcomes for a condition. Each prediction may be referred to as a primary output variable. Within each subset, each trained machine learning model 508 may be configured to predict a likelihood of the outcome occurring within a time window. For example, as illustrated in example of FIG. 5, the model execution module 412 may include subsets of trained machine learning models configured to predict outcomes for Condition 1 through Condition n. In the example of FIG. 5, the machine learning models 508-1, 508-2, and 508-3 form a subset that predicts outcomes for Condition 1; the machine learning models 508-4, 508-5, and 508-6 form another subset that predicts outcomes for Condition n.

Within the subset for Condition 1, each trained machine learning model may be configured to predict the likelihood of Condition 1 occurring within a specific time window. For example, within the subset for Condition 1, machine learning model 508-1 predicts the likelihood of Condition 1 occurring within Timeframe 1, machine learning model 508-2 predicts the likelihood of Condition 1 occurring within Timeframe 2, and machine learning model 508-3 predicts the likelihood of Condition 1 occurring within Timeframe 3. Similarly, within the subset for Condition n, machine learning model 508-4 predicts the likelihood of Condition n occurring within Timeframe 1, machine learning model 508-5 predicts the likelihood of Condition n occurring within Timeframe 2, and machine learning model 508-6 predicts the likelihood of Condition n occurring within Timeframe 3.

In various implementations, the model execution module 412 may be configured to predict outcomes for eight conditions, such as the eight conditions shown below in Table 2:

TABLE 2

| No. | Condition |
|---|---|
| 1 | Ischemia heart disease |
| 2 | Acute myocardial infarction |
| 3 | Coronary artery bypass graft surgery |
| 4 | Spinal fusion surgery |
| 5 | Stroke |
| 6 | Bariatric surgery |
| 7 | Inflammatory bowel disease |
| 8 | Hip and/or knee replacement |

In examples where the model execution module 412 is configured to predict outcomes for the conditions of Table 2, n may be eight. Each subset of trained machine learning models 508 may be configured to predict a likelihood of the respective condition of Table 2 occurring. In various implementations, each subset of machine learning models 508 may be configured to predict the respective condition of Table 2 occurring within one of the following time windows shown in below in Table 3. Additionally, Table 3 shows a example of a suitable machine learning model type for each time window:

TABLE 3

| No. | Timeframe | Model type | s |
|---|---|---|---|
| 1 | 1-90 days | Elastic-net classifier (a = 0.5; binomial deviance) | 100 |
| 2 | 91-270 days | Generalized additive model | 10 |
| 3 | 271-365 days | Gradient boosted trees classifier with early stopping | 1 |

Thus, if the model execution module 412 is configured in accordance with Tables 2 and 3, then, based on the unified set of input variables, machine learning model 508-1 may be configured to predict a likelihood of ischemia heart disease occurring within 1-90 days, machine learning model 508-2 may be configured to predict a likelihood of ischemia heart disease occurring within 91-270 days, machine learning model 508-3 may be configured to predict a likelihood of ischemia heart disease occurring within 271-365 days, machine learning model 508-4 may be configured to predict a likelihood of the member requiring a knee and/or hip replacement within 1-90 days, machine learning model 508-5 may be configured to predict a likelihood of the member requiring a knee and/or hip replacement within 91-270 days, and machine learning model 508-6 may be configured to predict a likelihood of the member requiring a knee and/or hip replacement within 271-365 days. While not explicitly shown in FIG. 5, the model execution module 412 may also be configured to include subsets of machine learning models 508 for each of conditions 2-7 of Table 2, and each subset may include machine learning models 508 for each of the timeframes of Table 3.

In various implementations, each of the model scoring modules 512 may parse the outputs of a subset of the machine learning models 508 corresponding to a given condition. Based on its analysis of the outputs, each of the model scoring modules 512 may output a single score based on the primary output variables predicted by each machine learning model 508 within a subset of machine learning models 508. Each single score output by a respective one of the model scoring modules 512 may be referred to as a secondary output variable. For example, the model scoring module 512-1 may parse the primary output variables generated by the machine learning models 508-1, 508-2, and 508-3, and generate Score 1 as the secondary output variable corresponding with Condition 1. Similarly, the model scoring module 512-2 may parse the primary output variables generated by machine learning models 508-4, 508-5, and 508-6, and generate Score n as the secondary output variable corresponding with Condition n.

In various implementations, each of the secondary output variables (e.g., Score 1 through Score n) may be provided to the score synthesis module 516. The Score synthesis module 516 may parse the secondary output variables from each of the model scoring modules 512 and automatically generated the single output variable based on a synthesis of the set of secondary output variables. The single output variable may also be referred to as a tertiary outcome variable. In various implementations, the score synthesis module 516 may save the tertiary outcome variable to the analysis database 520. The percentile analysis module 524 may compare the tertiary outcome variable calculated for the member against tertiary outcome variables for a population of members and determine a percentile score for the tertiary outcome variable calculated by the score synthesis module 516. The score transformation module 528 may save the percentile score determined by the percentile analysis module 524 as well as the tertiary outcome variable calculated by the score synthesis module 516 and save one or both scores to the score database 420. The percentile score may also be referred to as a quaternary output variable.

Flowcharts

Figure 6:
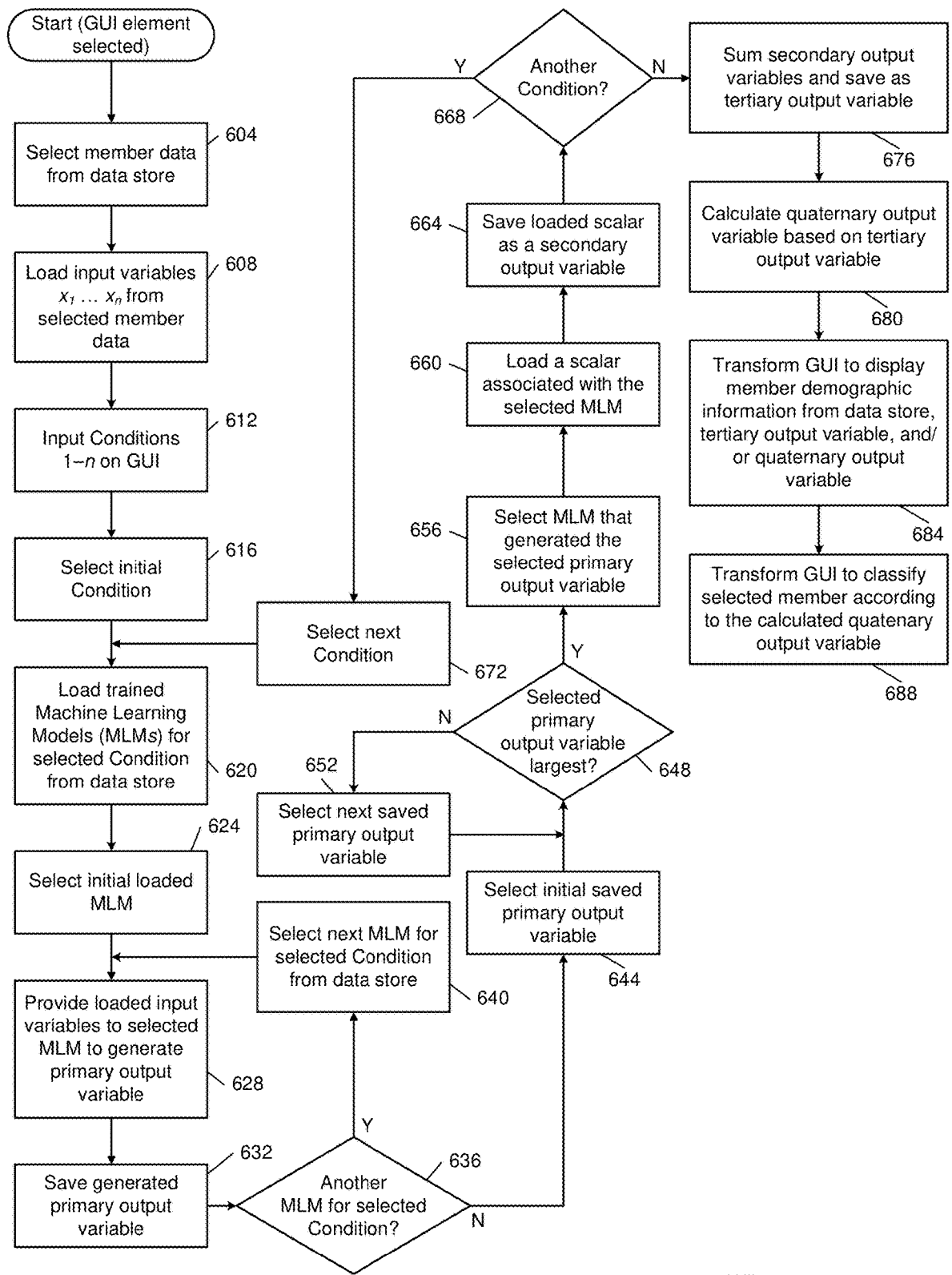
FIG. 6 is a flowchart of an example process for generating and outputting output variables using the action system of FIGS. 4 and 5.

FIG. 6 is a flowchart of an example process for generating and outputting output variables using the action system 130. The process begins at 604 in response to a user selecting a graphical user interface element. In various implementations, the user interface element may be generated by the user interface module 432 and accessed by the user device 108. In various implementations, the user interface element may allow the user to select a member whose data may be present in the storage devices 110. At 604, in response to the user interface element being selected, the extract/transform/load module 404 may select data relevant to the selected member from one or more data stores, such as the storage devices 110. In various implementations, the selected data may include any or all of the data structures described above in Table 1. In various implementations, each of the data structures may be correlated to the selected member. In various implementations, the collective data structures related to the any given member may be referred to as a persona. Control proceeds to 608.

At 608, the extract/transform/load module 404 may load the data structures selected at 604 and transform the loaded data structures into input variables suitable for use by the machine learning models 508. In various implementations, the extract/transform/load module 404 may save the input variables to the input database 408. Control proceeds to 612. At 612, the user interface module 432 generates elements allowing the user to select the conditions (e.g., the input variables) for the action system 130 to include when generating the tertiary output variable and/or the quaternary output variable. In various implementations, the conditions may be any or all of those described above in Table 2. The user may select any or all of the conditions via the generated user interface elements. Control proceeds to 616.

At 616, the model execution module 412 selects the initial condition from the conditions input at 612. For example, if the conditions of Table 2 were each selected and loaded at 612, the model execution module 412 may select Condition 1. Control proceeds to 620. At 620, the model execution module 412 may load the subset of trained machine learning models 508 corresponding to the condition selected at 616. As previously described, the loaded subset of trained machine learning models 508 may include a machine learning model 508 configured to predict the likelihood of the condition occurring with specific time window. In various implementations, the time windows (and the type of machine learning model corresponding to each time window) may be those described above in Table 3.

For example, if Condition 1 was selected at 616, then model execution module 412 may load machine learning models 508-1, 508-2, and 508-3. In various implementations, machine learning model 508-1 may be a trained elastic-net classifier trained to predict a likelihood of Condition 1 occurring within 1-90 days. In various implementations, machine learning model 508-2 may be a trained generalized additive model trained to predict a likelihood of Condition 1 occurring within 91-270 days. In various implementations, the machine learning model 508-3 may be a trained gradient boosted trees classifier with early stopping model trained to predict a likelihood of Condition 1 occurring within 271-365 days. Control proceeds to 624.

At 624, the model execution module 412 selects the initial trained machine learning model 508 loaded at 620. Control proceeds to 628. At 628, the feature extraction module 504 loads the input variables from the input database 408 and provides the input variables to the selected machine learning model 508. The selected machine learning model 508 generates the primary output variable based on the input variables. Control proceeds to 632. At 632, the model execution module 412 saves the primary output variable generated at 628 and proceeds to 636. For example, one of the machine learning models 508 may provide the generated primary output variable to one of the model scoring modules 512. At 636, the model execution module 412 determines whether another trained machine learning module 508 was loaded for the selected condition. If the model execution module 412 determines that another trained machine learning module 508 was loaded, control proceeds to 640 to select the next machine learning module 508 loaded for the selected condition and proceeds back to 628. Otherwise, control proceeds to 644.

At 644, the model scoring module 512 selects the initial saved primary output variable. Control proceeds to 648. At 648, the model scoring module 512 determines whether the selected primary output variable is the largest primary output variable from the output variables generated for the selected condition. If at 648 the selected primary output variable is not the largest primary output variable, control proceeds to 652. If at 648 the selected primary output variable is the largest primary output variable, control proceeds to 656. At 652, the model scoring module 512 selects the next primary output variable for the selected condition and proceeds back to 648.

At 656, the model scoring module 512 selects the machine learning model 508 that generated the selected primary output variable and loads a scalar s associated with the selected machine learning model 508. In various implementations, the machine learning model 508 for each time window may be associated with a unique scalar s. In various implementations, the machine learning model 508 for each time window may be associated with the scalar s shown above in Table 3. Control proceeds to 660.

At 660, the scalar s associated with the selected machine learning model 508 may be loaded at the score synthesis module 516. Control proceeds to 664, where the score synthesis module 516 saves the loaded scalars as the secondary output variable associated with the selected condition. Control proceeds to 668. At 668, the model execution module 412 determines whether another condition was input at 612. If at 668, the model execution module 412 determines that another condition was input, control proceeds to 672, where the model execution module 412 selects the next condition. Otherwise, control proceeds to 676.

At 676, the score synthesis module 516 sums all of the saved secondary output variables and saves the sum as the tertiary output variable. In various implementations, the score synthesis module 516 may save the tertiary output variable to the analysis database 520. Control proceeds to 680. At 680, the percentile analysis module 524 and/or the score transformation module 528 may access the tertiary output variable saved to the analysis database 520 and automatically calculate the quaternary output variable based on the tertiary output variable. For example, the percentile analysis module 524 may compare the tertiary output variable saved to the analysis database 520 for the selected member against tertiary output variables calculated by the model execution module 412 for other members (e.g., historical tertiary output variables generated for a population of other members) and generate a percentile score for the tertiary output variable for the selected member. The score transformation module 528 may save the percentile score calculated by the percentile analysis module 524 to the score database 420 as the quaternary output variable. Control proceeds to 684.

At 684, the user interface module 432 transforms the graphical user interface to display demographic information for the selected member (which may be retrieved from the storage devices 110), the tertiary output variable (which may be retrieved from the score database 420), and/or the quaternary output variable (which may be retrieved from the score database 420). The user may access the transformed graphical user interface via the user device 108. Control proceeds to 688. At 688, the user interface module 432 transforms the graphical user interface to further classify the member and/or generate action sets according to the quaternary output variable calculated for the selected member.

Figure 6A:
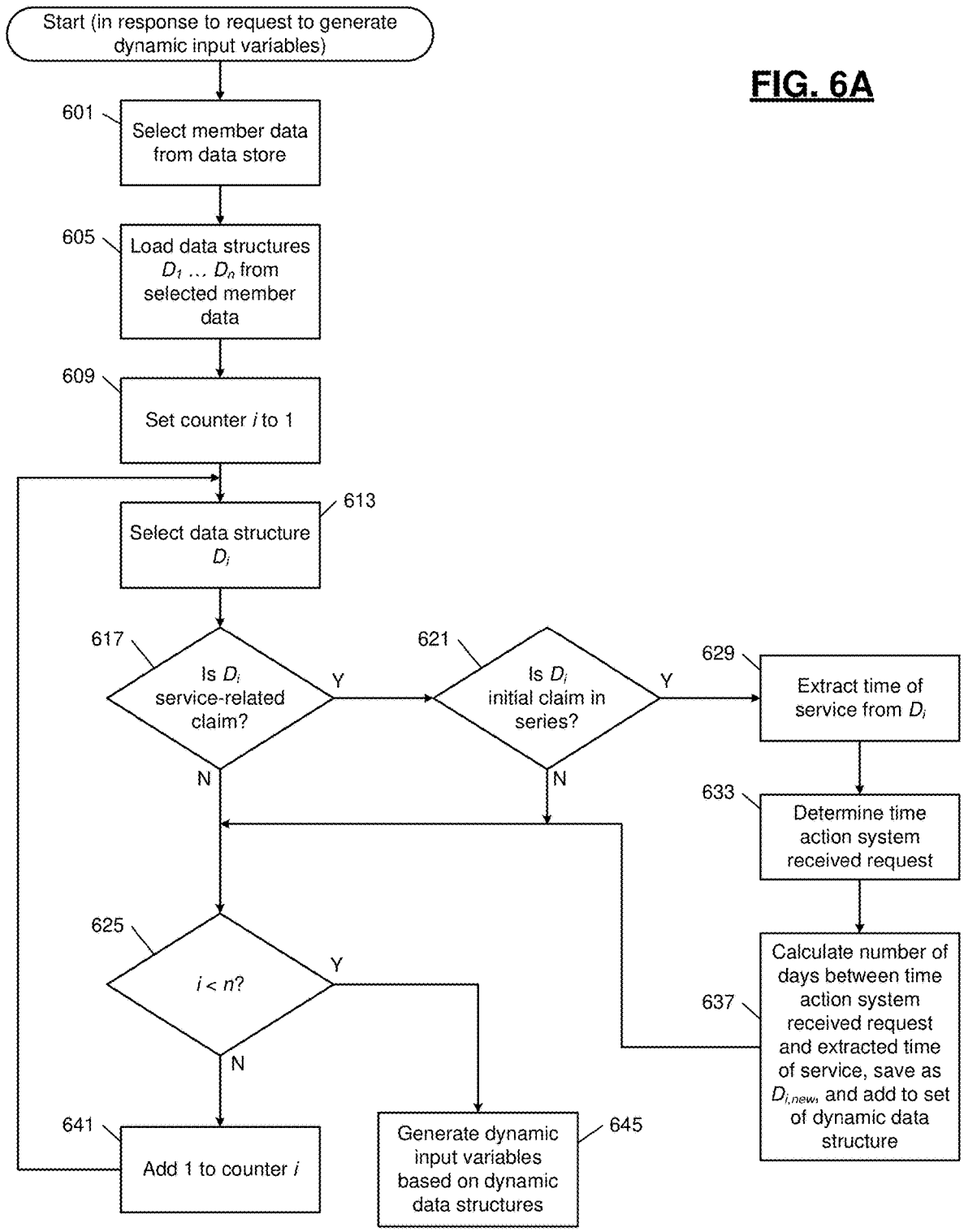
FIG. 6A is a flowchart of an example process for generating dynamic input variables for the action system of FIGS. 4 and 5.

FIG. 6A is a flowchart of an example process for generating dynamic input variables for the action system 130. In various implementations, the process begins at 601 in response to the user selecting a graphical user interface element. For example, the process may begin in response to the user accessing the user interface module 432 via the user device 108 and selecting an element for generating dynamic input variables. In various implementations, the user interface module 432 may generate a user interface element that allows the user to select a specific member. In various implementations, the process begins at 601 in response to the user selecting the graphical user interface element corresponding to the specific member. At 601, the extract/transform/load module 404 may select data relevant to the selected member from one or more data stores, such as storage devices 110. In various implementations, the data may include any or all of the data structures described above in Table 1. In various implementations, each of the data structures may be correlated to the selected member. Control proceeds to 605.

At 605, the extract/transform/load module 404 may load the data structures $D_1 \ldots D_n$ selected at 601. Control proceeds to 609. At 609, the extract/transform/load module 404 sets a counter i to 1. Control proceeds to 613. At 613, the extract/transform/load module 404 selects the i-th data structure $D_i$ from the data structures $D_1$ through $D_n$ loaded at 605. Control proceeds to 617. At 617, the extract/transform/load module 404 determines whether the data structure $D_i$ selected at 613 is a service-related claim. For example, the selected data structure $D_i$ may be a service-related claim if it is or is related to the member seeking professional medical services (e.g., primary care visits, specialist visits, physician visits, lab tests, radiology visits, prescription utilization, etc.). If at 617 the extract/transform/load module 404 determines that $D_i$ is a service-related claim, control proceeds to 621. If at 617 the extract/transform/load module 404 determines that $D_i$ is not a service-related claim, control proceeds to 625.

At 621, the extract/transform/load module 404 determines whether the data structure $D_i$ selected at 613 is the initial claim in a series of service-related claims. If the answer is yes, control proceeds to 629. Otherwise, control proceeds to

625. For example, if $D_i$ is the initial claim in a series of related claims for a particular condition, then the answer at 629 may be yes. At 629, the extract/transform/load module 404 extracts a time of service from the data structure $D_i$. In various implementations, the time of service may be a date that the service was performed for the claim. Control proceeds to 633. At 633, the extract/transform/load module 404 determines a time the action system 130 received the request to generate and output the output variables. In various implementations, the time may be the time the graphical user interface elements were selected before 604 and/or 601. Control proceeds to 637.

At 637, the extract/transform/load module 404 calculates a number of days between the time the action system 130 received the request to generate and output the output variables and the time of service extracted at 633. For example, if $D_i$ is the initial claim for the first cardiologist visit in a series of cardiologist visits that took place on Sep. 1, 2018 and the action system 130 received the request to generate and output the output variables on Jan. 1, 2019, then the number of days calculated at 637 may be about 122 days. In various implementations, the number of days may be about 123 days. The extract/transform/load module 404 then saves the number of days between the time the action system 130 received the request to generate and output the output variables and the time of service extracted at 633 as a new dynamic data structure $D_{i,new}$ and saves it to a set of new dynamic data structures. Control proceeds to 625. In various implementations, some exemplary dynamic data structures that may be generated based on Table 1 are shown below in Table 5:

TABLE 5

| Dynamic data structures (potential input variables) |
| --- |
| Days between office visit and action system request |
| Days between lab work and action system request |
| Days between radiology lab and action system request |
| Days between advanced imaging lab and action system request |
| Days between rehabilitation visit and action system request |
| Days between inpatient visit and action system request |
| Days between emergency room visit and action system request |
| Days between PCP visit and action system request |
| Days between cardiologist visit and action system request |
| Days between X-ray visit and action system request |
| Days between MRI visit and action system request |
| Days between CT visit and action system request |
| Days between CABG surgery visit and action system request |

At 625, the extract/transform/load module 404 determines whether i is less than n. If at 625 i is less than n, control proceeds to 641, where control adds 1 to the counter i and proceeds back to 613. Otherwise, control proceeds to 645. At 645, the extract/transform/load module 404 generates dynamic input variables based on the dynamic data structures. In various implementations, the dynamic input variables may be added to the input variables loaded at 608, 808, and/or 908. In various implementations, the dynamic input variables may be loaded as the input variables at 608, 808, and/or 908.

Figure 7:
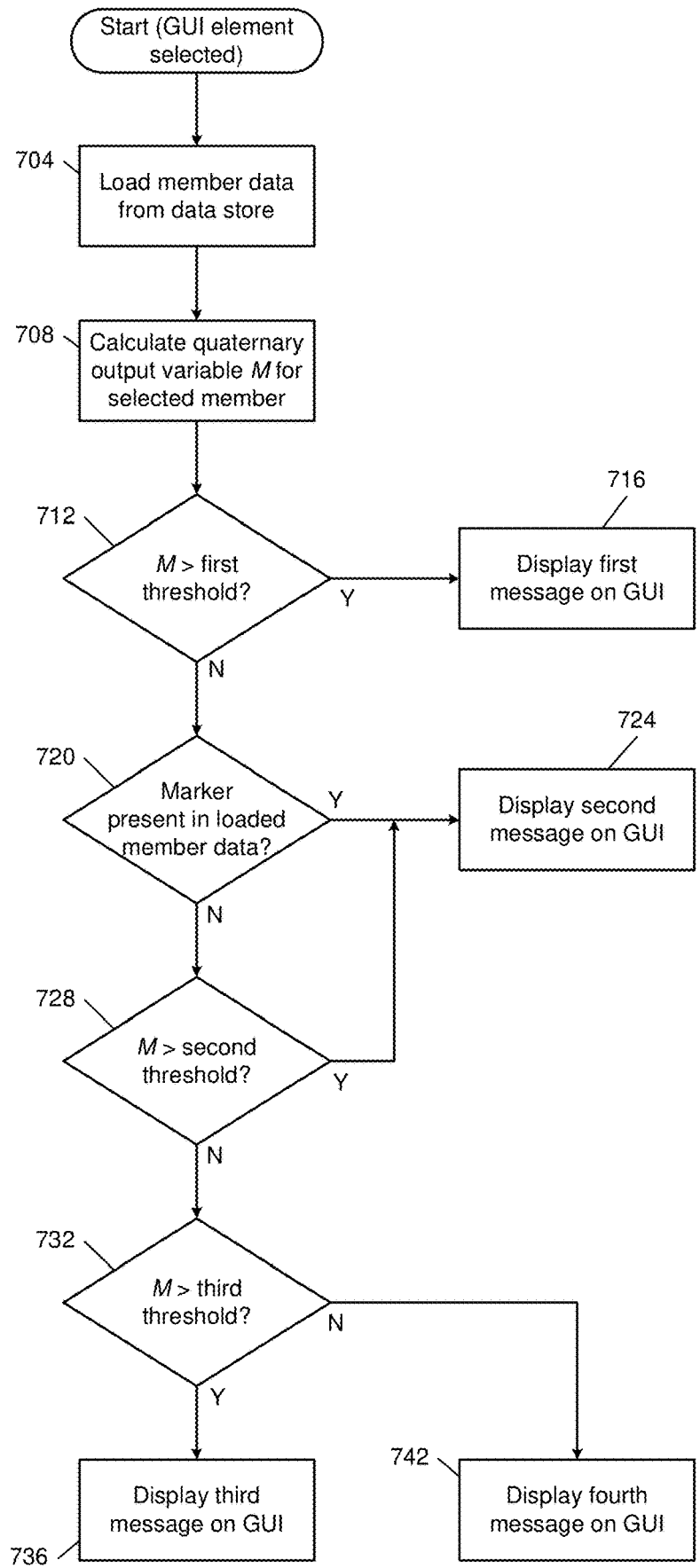
FIG. 7 is a flowchart of an example process for transforming a graphical user interface to classify a selected member according to a calculated quaternary output variable.

FIG. 7 is a flowchart of an example process for transforming the graphical user interface to classify the selected member according to the calculated quaternary output variable. In various implementations, the process begins at 704 in response to the user selecting a graphical user interface element. For example, the process may begin in response to the user accessing the user interface module 432 via the user device 108 and selecting an element to perform automated analysis on the member. In various implementations, the user interface module 432 may generate an element allowing the user to select a specific member. At 704, in response to the user selecting the element corresponding to the member, extract/transform/load module 404 loads member data from the storage devices 110, transforms the member data, and saves the transformed member data as input variables. Control proceeds to 708, where the model execution module 412 calculates a quaternary output variable for the member based on the input variables. Control proceeds to 712.

At 712, the user interface module 432 determines whether the quaternary output variable exceeds a first threshold. In various implementations, the first threshold may be the about the 70th percentile. If at 712 the user interface module 432 determines that the quaternary output variable exceeds the first threshold, control proceeds to 716. Otherwise, control proceeds to 720. At 716, the user interface module 432 transforms the graphical user interface to output a first message to the user device 108. In various implementations, the first message may be a message referring the member to case management. At 720, the user interface module 432 determines whether a marker is present in the member data. In various implementations, the marker may be an indicator of chronic kidney disease. If at 720 the user interface module 432 determines that the marker is present, control proceeds to 724. Otherwise, control proceeds to 728. At 724, the user interface module 432 transforms the graphical user interface to output a second message to the user device 108. In various implementations, the second message may be a message referring the member to telephonic coaching.

At 712, the user interface module 432 determines whether the quaternary output variable exceeds a first threshold. In various implementations, the first threshold may be the about the 70th percentile. If at 728 the user interface module 432 determines that the quaternary output variable exceeds the second threshold, control proceeds to 724. In various implementations, the second threshold may be about the 56th percentile. Otherwise, control proceeds to 732. At 732, the user interface module 432 determines whether the quaternary output variable exceeds a third threshold. In various implementations, the third threshold may be about the 11th percentile. If at 732 the user interface module 432 determines that the quaternary output variable exceeds the third threshold, control proceeds to 736. Otherwise, control proceeds to 742. At 736, the user interface module 432 transforms the graphical user interface to output a third message to the user device 108. In various implementations, the third message may be a message referring the member for digital intervention. At 742, the user interface module 432 transforms the graphical user interface to output a fourth message to the graphical user interface. In various implementations, the fourth message may be a message indicating that intervention is not required for the member.

In various implementations, the action set sequencing module 424 may automatically execute one or more action execution modules based on the transformations of the user interface. For example, if the user interface is transformed to display the first message at 716, the action set sequencing module 424 may execute a corresponding action execution module, such as action execution module a 436. In various implementations, action execution module a 426 may automatically send an electronic message containing the member data, the input variables, the tertiary output variable, and/or the quaternary output variable to case management personnel. In various implementations, if the user interface is transformed to display the second message at 724, the action set sequencing module 424 may automatically execute a corresponding action execution module, such as action execution module b 440. In various implementations, action execution module b 440 may automatically schedule the member for telephonic coaching with a healthcare provider. In various implementations, if the user interface is transformed to display the third message at 736, the action set sequencing module 424 may automatically execute a corresponding action execution module, such as action execution module x 444. In various implementations, action execution module x 444 may automatically perform digital intervention, such as electronically alerting healthcare providers with an electronic message containing the member data, the input variables, the tertiary output variable, and/or the quaternary output variable.

Figure 8:
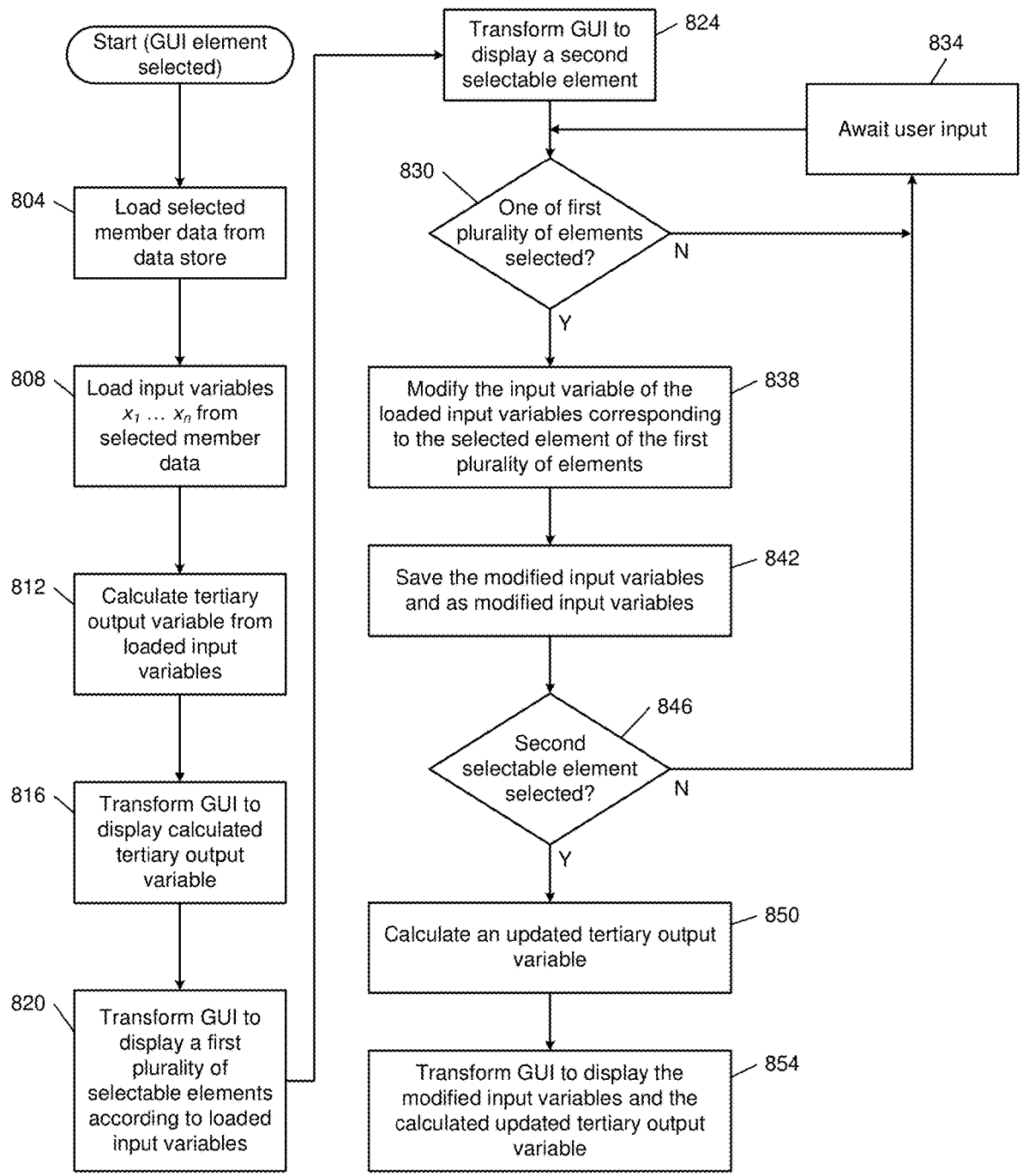
FIG. 8 is a flowchart of an example process for selectively performing sensitivity analysis on input variables and transforming a graphical user interface based on the results of the sensitivity analysis.

FIG. 8 is a flowchart of an example process for selectively performing sensitivity analysis on the input variables and transforming the graphical user interface based on the results of the sensitivity analysis. In various implementations, the process begins in response to the user selecting a graphical user interface element. In various implementations, the process begins at 804 in response to the user accessing the user interface module 432 via the user device 108 and selecting an element to perform sensitivity analysis on the member. In various implementations, the user interface module 432 may generate an element allowing the user to select a specific member. At 804, the extract/transform/load module 404 loads member data for the selected member from the storage devices 110, transforms the member data into input variables, and saves the input variables to the input database 408. Control proceeds to 808. At 808, the model execution module 412 loads the input variables from the input database 408. Control proceeds to 812.

At 812, the model execution module 412 calculates the tertiary output variable based on the loaded input variables and saves the tertiary output variable to the score database 420. Control proceeds to 816. At 816, the user interface module 432 transforms the user interface to display the calculated tertiary output variable. Control proceeds to 820. At 820, the user interface module 432 transform the user interface to display a first plurality of selectable elements. In various implementations, each element of the first plurality of selectable elements corresponds to one of the input variables loaded at 808. Control proceeds to 824. At 824, the user interface module 432 transforms the graphical user interface to display a second selectable element. Control proceeds to 830.

At 830, the user interface module 432 determines whether one of the first plurality of selectable elements is selected. If at 830 the answer is no, control proceeds to 834, where the user interface module 432 awaits further input. Otherwise, if at 830 the user interface module 432 determines that one of the first plurality of elements has been selected, the extract/transform/load module 404 modifies the input variable stored in the input database 408 corresponding to the selected element of the first plurality of elements. Control proceeds to 842. At 842, the extract/transform/load module 404 saves the modified input variables to the input database 408. Control proceeds to 846.

At 846, the user interface module 432 determines whether the second selectable element generated at 824 is selected. If the answer is no, control proceeds to 834. Otherwise, if the user interface module 432 determines that the second selectable element has been selected, control proceeds to 850. At 850, the model execution module 412 accesses the modified input variables saved at the input database 408, calculates an updated tertiary output variable, and saves the calculated updated tertiary output variable to the score database 420. Control proceeds to 854. At 854, the user interface module 432 transforms the graphical user interface to display the input variables that were modified at 838 and the updated tertiary output variable.

Figure 9:
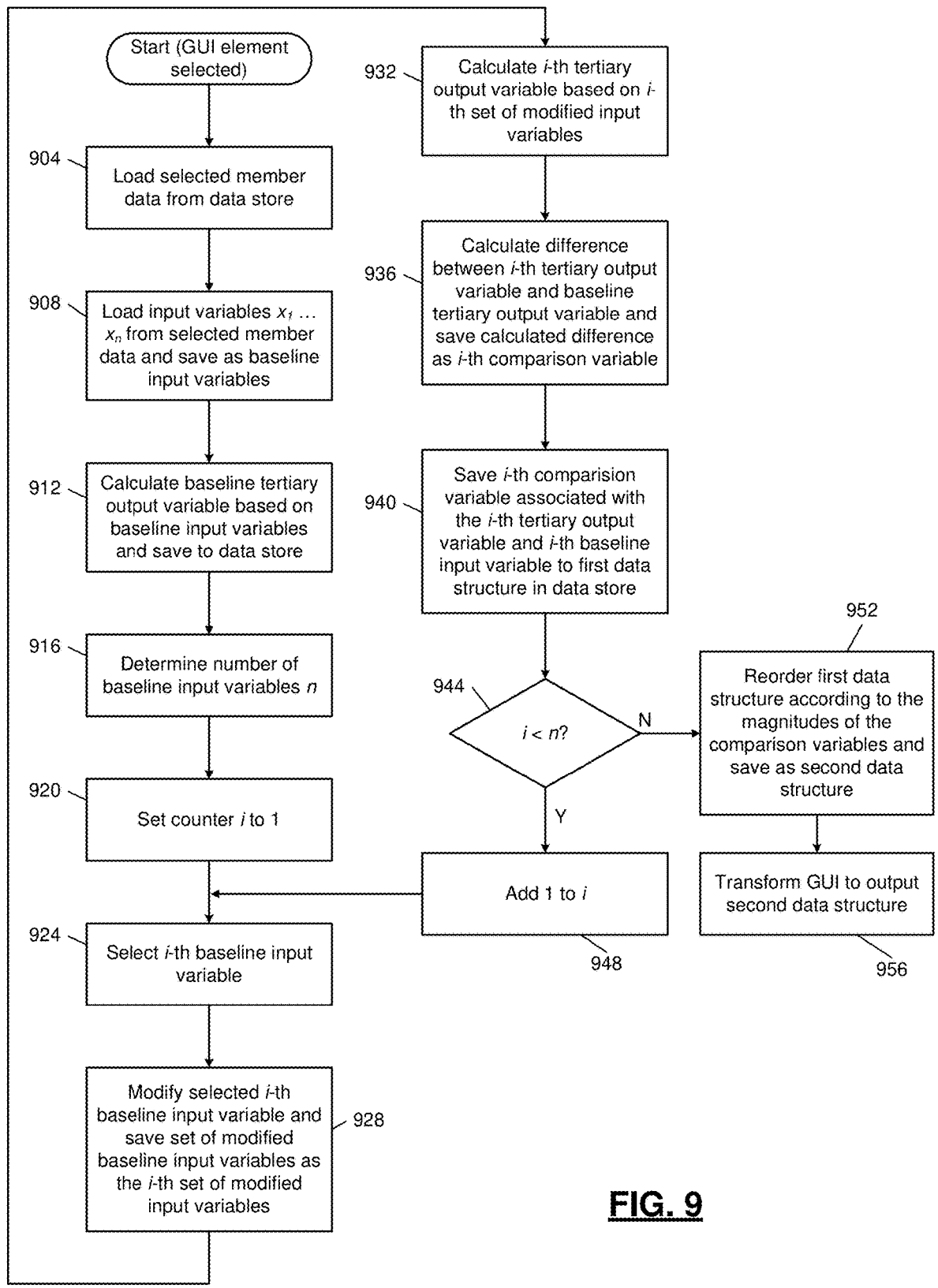
FIG. 9 is a flowchart of an example process for selectively performing sensitivity analysis on an input variables and transforming a graphical user interface based on the results of the sensitivity analysis.

FIG. 9 is a flowchart of an example process for selectively performing sensitivity analysis on the input variables and transforming the graphical user interface based on the results of the sensitivity analysis. In various implementations, the process begins in response to the user selecting a graphical user interface element. In various implementations, the process begins at 904 in response to the user accessing the user interface module 432 via the user device 108 and selecting an element to perform sensitivity analysis on the member. In various implementations, the user interface module 432 may generate an element allowing the user to select a specific member. At 904, the extract/transform/load module 404 loads member data for the selected member from the storage devices 110 and transforms the member data into input variables. The extract/transform/load module 404 saves the input variables to the input database 408. Control proceeds to 908. At 908, the input modification module 452 and/or the iterative evaluation module 456 loads the input variables from the input database 408 and saves the loaded input variables to the input database 408 as baseline input variables. Control proceeds to 912.

At 912, the model execution module 412 loads the baseline input variables from the input database 408 and calculates a baseline tertiary output variable based on the baseline input variables. The model execution module 412 saves the baseline tertiary output variable to the score database 420. Control proceeds to 916. At 916, the input modification module 452 and/or the iterative evaluation module 456 determines the number of baseline input variables n present in the baseline input variables saved in the input database 408. Control proceeds to 920. At 920, the input modification module 452 and/or the iterative evaluation module 456 sets a counter i to 1. Control proceeds to 294. At 924, the input modification module 452 and/or the iterative evaluation module 456 selects the i-th baseline input variable from the input database 408. For example, if i is set to 1, the input modification module 452 and/or the iterative evaluation module 456 selects the first baseline input variable from the input database 408. Control proceeds to 928.

At 928, the input modification module 452 and/or the iterative evaluation module 456 modifies the selected i-th baseline input variable and saves the set of modified baseline input variables as the i-th set of modified input variables in the input database 908. In various implementations, the input modification module 452 and/or the iterative evaluation module 456 modifies only the selected i-th baseline input variable while leaving the remaining baseline input variables unmodified. Control proceeds to 932. At 932, the model execution module 412 loads the i-th set of modified output variables from the input database 908 and calculates an i-th tertiary output variable based on the i-th set of modified output variables. The model execution module 412 saves the i-th tertiary output variable to the score database 420. Control proceeds to 936.

At 936, the input modification module 452 and/or the iterative evaluation module 456 accesses the i-th tertiary output variable and the baseline tertiary output variable from the score database 420. The input modification module 452 and/or the iterative evaluation module 456 calculates a difference between the i-th tertiary output variable and the baseline tertiary output variable and saves the calculated difference as the i-th comparison variable (for example, to the score database 420). Control proceeds to 940. At 940, the input modification module 452 and/or the iterative evaluation module 456 generates a first data structure, adds the i-th comparison variable, the i-th tertiary output variable, and the i-th baseline input variable to the first data structure. The input modification module 452 and/or the iterative evaluation module 456 associates the i-th comparison variable with the i-th tertiary output variable and the i-th baseline input variable in the first data structure and saves the first data structure to the score database 420. Control proceeds to 944.

At 944, the input modification module 452 and/or the iterative evaluation module 456 determines whether i is less than n. If at 944 the input modification module 452 and/or the iterative evaluation module 456 determines that i is less than n, control proceeds to 948. Otherwise, control proceeds to 952. At 948, the input modification module 452 and/or the iterative evaluation module 456 adds 1 to i and proceeds back to 924. At 952, the input modification module 452 and/or the iterative evaluation module 456 accesses the first data structure from the score database 420, reorders the first data structure according to the magnitudes of the comparison variables present in the first data structure, and saves the reordered first data structure as a second data structure. Control proceeds to 956. At 956, the user interface module 432 accesses the second data structure and transforms the graphical user interface to output the second data structure. In various implementations, the user device 108 may access the transformed graphical user interface via the user interface module 432.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A computerized method of transforming an interactive graphical user interface responsive to machine learning predictions, the method comprising:
   generating, at the graphical user interface, a selectable user interface element, wherein the selectable user interface element corresponds to a persona;
   in response to a user selecting the selectable user interface element, extracting, from a first data store, data structures related to the persona;
   transforming, at a data processing module, the data structures into a set of input variables;
   loading, at a model execution module, the set of input variables;
   generating, at the model execution module, a first output variable based on the set of input variables;
   generating, at an analysis module, a second output variable based on the first output variable by:
      loading, at each machine learning model of a first set of machine learning models, the set of input variables,
      generating, at the first set of machine learning models, a first set of first intermediate output variables based on the set of input variables,
      determining a largest first intermediate output variable of the first set of first intermediate output variables, and
      determining a second intermediate output variable for the first set of machine learning models based on the machine learning model corresponding to the largest first intermediate output variable of the first set of first intermediate output variables; and
   in response to the second output variable exceeding a first threshold, transforming the graphical user interface to display a first message.

2. The method of claim 1 wherein generating the first output variable based on the set of input variables includes:
   loading, at each machine learning model of a second set of machine learning models, the set of input variables;
   generating, at the second set of machine learning models, a second set of first intermediate output variables based on the set of input variables;
   determining a largest first intermediate variable of the second set of first intermediate output variables; and
   determining a second intermediate output variable for the second set of machine learning models based on the machine learning model corresponding to the largest first intermediate output variable of the second set of first intermediate output variables.

3. The method of claim 2 wherein generating the first output variable based on the set of input variables includes summing the second intermediate output variable for the first set of first intermediate output variables and the second intermediate output variable for the second set of first intermediate output variables to generate the first output variable.

4. The method of claim 3 wherein the first set of machine learning models includes:
- a first trained machine learning model configured to predict a likelihood of a first condition occurring within a first time window;
- a second trained machine learning model configured to predict a likelihood of the first condition occurring within a second time window; and
- a third trained machine learning model configured to predict a likelihood of the first condition occurring within a third time window.

5. The method of claim 4 wherein:
- the first trained machine learning model is an elastic-net classifier;
- the second trained machine learning model is a generalized additive model; and
- the third trained machine learning model is a gradient boosted trees classifier model.

6. The method of claim 5 wherein:
- the first time window is between 1 and 90 days;
- the second time window is between 91 and 270 days; and
- the third time window is between 271 and 365 days.

7. The method of claim 1 wherein generating the second output variable based on the first output variable includes determining a percentile score of the first output variable for the persona by comparing the first output variable against a set of historical first output variables generated for a population.

8. The method of claim 1 further comprising:
- in response to the second output variable not exceeding the first threshold and a marker being present in the data structures, transforming the graphical user interface to display a second message;
- in response to the second output variable exceeding a second threshold, transforming the graphical user interface to display the second message; and
- in response to the second output variable exceeding a third threshold, transforming the graphical user interface to display a third message.

9. The method of claim 8 wherein:
- generating the second output variable based on the first output variable includes determining a percentile score of the first output variable for the persona by comparing the first output variable against a set of historical first output variables generated for a population;
- the first threshold is about a 70th percentile score;
- the second threshold is about a 56th percentile score; and
- the third threshold is about an 11th percentile score.

10. The method of claim 8 wherein:
- in response to the graphical user interface being transformed to display the first message, an action set sequencing module is configured to execute a first action execution module;
- in response to the graphical user interface being transformed to display the second message, the action set sequencing module is configured to execute a second action execution module; and
- in response to the graphical user interface being transformed to display the third message, the action set sequencing module is configured to execute a third action execution module.

11. The method of claim 1 wherein transforming the data structures into the set of input variables includes:
- loading a first data structure corresponding to the persona;
- determining whether the first data structure is a claim related to a service;
- in response to determining the first data structure is related to a service, calculating a time difference between a time the service was performed and a time the selectable user interface element was generated;
- transforming the time difference into a dynamic input variable; and
- adding the dynamic input variable to the set of input variables.

12. A computerized method of transforming an interactive graphical user interface according to machine learning, the method comprising:
- generating, at the graphical user interface, a first selectable user interface element, the first selectable user interface element corresponding to a persona;
- in response to a user selecting the selectable user interface element, extracting, from a first data store, data structures related to the persona;
- transforming, at a data processing module, the data structures into a set of input variables;
- loading, at a model execution module, the set of input variables;
- generating, at the model execution module, a first output variable based on the set of input variables by:
  - loading, at each machine learning model of a first set of machine learning models, the set of input variables,
  - generating, at the first set of machine learning models, a first set of first intermediate output variables based on the set of input variables,
  - determining a largest first intermediate output variable of the first set of first intermediate output variables, and
  - determining a second intermediate output variable for the first set of machine learning models based on the machine learning model corresponding to the largest first intermediate output variable of the first set of first intermediate output variables;
- generating, at an analysis module, a second output variable based on the first output variable;
- transforming the graphical user interface to display the second output variable;
- generating a second selectable user interface element; and
- in response to the user selecting the second selectable user interface element:
  - modifying the set of input variables;
  - generating, at the model execution module, a modified first output variable based on the modified set of input variables;
  - generating, at the analysis module, a modified second output variable based on the modified first output variable; and
  - transforming the graphical user interface according to the modified second output variable.

13. The method of claim 12 wherein generating the first output variable based on the set of input variables includes:
- loading, at each machine learning model of a second set of machine learning models, the set of input variables;
- generating, at the second set of machine learning models, a second set of first intermediate output variables based on the set of input variables;
- determining a largest first intermediate variable of the second set of first intermediate output variables; and
- determining a second intermediate output variable for the second set of machine learning models based on the machine learning model corresponding to the largest first intermediate output variable of the second set of first intermediate output variables.

14. The method of claim 13 wherein generating the first output variable based on the set of input variables includes summing the second intermediate output variable for the first set of first intermediate output variables and the second intermediate output variable for the second set of first intermediate output variables to generate the first output variable.

15. The method of claim 14 wherein the first set of machine learning models includes:
- a first trained machine learning model configured to predict a likelihood of a first condition occurring within a first time window;
- a second trained machine learning model configured to predict a likelihood of the first condition occurring within a second time window; and
- a third trained machine learning model configured to predict a likelihood of the first condition occurring within a third time window.

16. The method of claim 15 wherein:
the first trained machine learning model is an elastic-net classifier;
the second trained machine learning model is a generalized additive model; and
the third trained machine learning model is a gradient boosted trees classifier model.

17. The method of claim 12 wherein transforming the data structures into the set of input variables includes:
- loading a first data structure corresponding to the persona;
- determining whether the first data structure is a claim related to a service;
- in response to determining the first data structure is related to a service, calculating a time difference between a time the service was performed and a time the selectable user interface element was generated;
- transforming the time difference into a dynamic input variable; and
- adding the dynamic input variable to the set of input variables.

18. A non-transitory computer-readable medium comprising executable instructions for transforming a graphical user interface according to machine learning, wherein the executable instructions include:
- generating, at the graphical user interface, a selectable user interface element, the selectable user interface element corresponding to a persona;
- in response to a user selecting the selectable user interface element, extracting, from a first data store, data structures related to the persona;
- transforming, at a data processing module, the data structures into a set of input variables;
- loading, at a model execution module, the set of input variables;
- generating, at the model execution module, a first output variable based on the set of input variables by:
  - loading, at each machine learning model of a first set of machine learning models, the set of input variables,
  - generating, at the first set of machine learning models, a first set of first intermediate output variables based on the set of input variables,
  - determining a largest first intermediate output variable of the first set of first intermediate output variables,
  - determining a second intermediate output variable for the first set of machine learning models based on the machine learning model corresponding to the largest first intermediate output variable of the first set of first intermediate output variables,
  - loading, at each machine learning model of a second set of machine learning models, the set of input variables,
  - generating, at the second set of machine learning models, a second set of first intermediate output variables based on the set of input variables,
  - determining a largest first intermediate output variable of the second set of first intermediate output variables, and
  - determining a second intermediate output variable for the second set of machine learning models based on the machine learning model corresponding to the largest first intermediate output variable of the second set of first intermediate output variables;
- generating, at an analysis module, a second output variable based on the first output variable;
- in response to the second output variable exceeding a first threshold, transforming the graphical user interface to display a first message;
- in response to the second output variable not exceeding the first threshold and a marker being present in the data structures, transforming the graphical user interface to display a second message;
- in response to the second output variable exceeding a second threshold, transforming the graphical user interface to display the second message; and
- in response to the second output variable exceeding a third threshold, transforming the graphical user interface to display a third message.

19. The non-transitory computer-readable medium of claim 18 wherein the first set of machine learning models includes:
- a first trained machine learning model that is an elastic-net classifier configured to predict a likelihood of a first condition occurring within a first time window,
- a second trained machine learning model that is a generalized additive model configured to predict a likelihood of the first condition occurring within a second time window, and
- a third trained machine learning model that is a gradient boosted trees classifier model configured to predict a likelihood of the first condition occurring within a third time window.

20. The non-transitory computer-readable medium of claim 18 wherein transforming the data structures into the set of input variables includes:
- loading a first data structure corresponding to the persona;
- determining whether the first data structure is a claim related to a service;
- in response to determining the first data structure is related to a service, calculating a time difference between a time the service was performed and a time the selectable user interface element was generated;
- transforming the time difference into a dynamic input variable; and
- adding the dynamic input variable to the set of input variables.

* * * * *